April 3, 1962 D. L. RINGWALT 3,028,089

DELAY LINE FUNCTION GENERATOR

Filed Oct. 19, 1959

INVENTOR
DAVID L. RINGWALT

BY *Richard C. Reed*

ATTORNEY

United States Patent Office 3,028,089

Patented Apr. 3, 1962

3,028,089

DELAY LINE FUNCTION GENERATOR

David L. Ringwalt, Alexandria, Va., assignor to the United States of America as represented by the Secretary of the Navy Filed Oct. 19, 1959, Ser. No. 847,436
1 Claim. (Cl. 235—164)
(Granted under Title 35, U.S. Code (1952), sec. 266)

The invention described herein may be manufactured and used by or for the Government of the United States of America for governmental purposes without the payment of any royalties thereon or therefor.

This invention relates to computing devices in general and in particular to devices for producing multiplication of an input quantity by a desired factor typically greater or less than unity and also including unity as well.

In many instances involving the analysis and interpretation of data obtained through experimental operations it is desired to produce multiplication or division of a selected quantity by some factor which may be greater or less than unity. A typical illustration of such a situation would be in the analysis of radar return data where it is desired to obtain the absolute value of signal strength and wherein the receiver involved has some specific nonlinear amplification characteristic. In such a situation it would be desired to multiply the output signal amplitude from such a receiver by an appropriate factor to obtain a true picture of input signal strength. Devices for producing such a manipulation have been available in the prior art. However, for the most part, such devices have been complex in one respect or another leaving much room for improvement along specific lines.

It is accordingly an object of the present invention to provide a simplified computer device for producing multiplication or division of a quantity by a selectable factor.

It is another object of the present invention to provide a computer device for multiplying a quantity by a selectable factor wherein rapid and positive variation of that factor can be readily accomplished.

Other and further objects and features of the present invention will become apparent upon careful consideration of the following detailed description and accompanying drawings wherein.

In accordance with the basic features of the present invention an apparatus is provided for producing multiplication or division of an input quantity by a selectable factor wherein the input quantity is received or converted into pulse signal form of a binary digital nature, and employed to control the duration of a timing period during which pulses are produced at a selected recurrence rate, thereby controlling the quantity of output pulses to be produced. For example, if multiplication by a factor of 1.25 is desired, the apparatus would be constructed in such manner as to produce the delivery of five output pulses in response to each four input pulses. In greater particularity, the input quantity is stored in an input register, making operation of the circuit independent of the time during which the input pulses occur. The control pulses are then delivered to second and third registers, the second register receiving one less pulse than the third register. When coincidence between the first two registers is established, the third register is caused to deliver an output signal which will be greater than the input quantity in dependency on the amount of control signals which were omitted from the group delivered to the second register, in this instance one pulse. At this time the equipment will be reset to provide recurrent operation for the next series of four pulses to provide five output pulses in response thereto. Control over the multiplication ratio is effected merely by controlling the quantity of pulses omitted from the control pulses delivered to the second and third registers.

Figure 1:
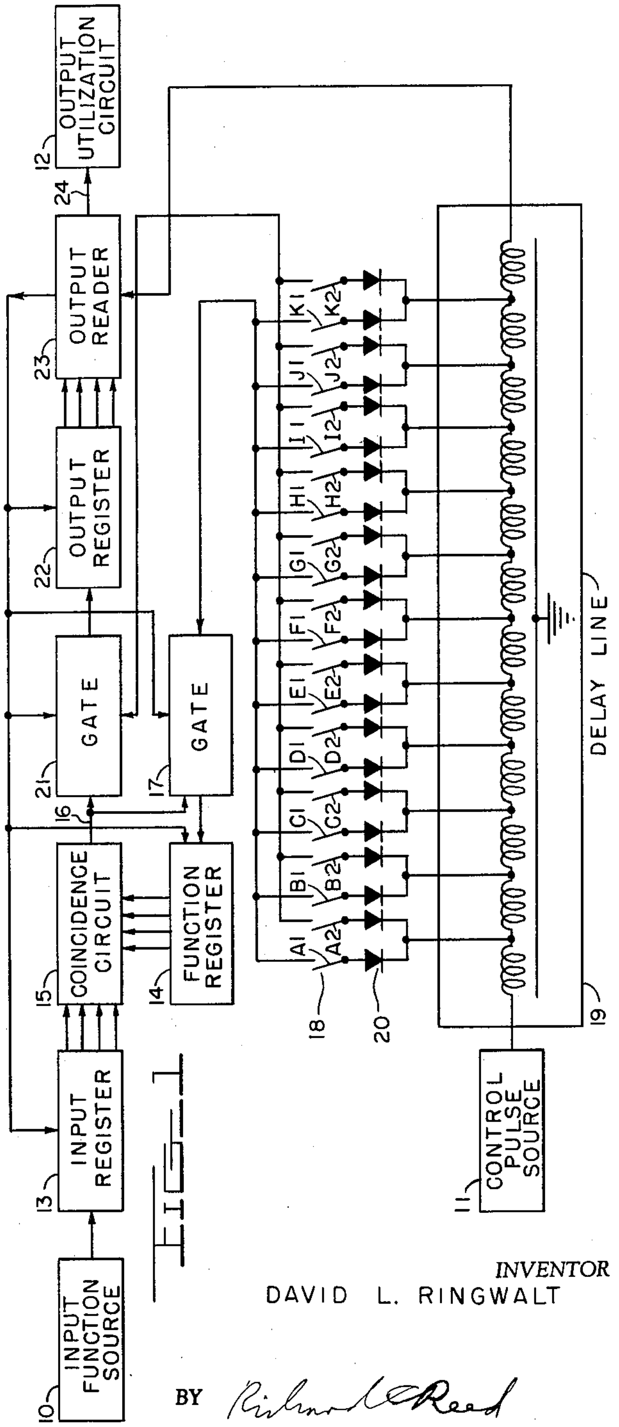
FIG. 1 shows a typical embodiment of the features of the present invention.

With reference now to FIG. 1 of the drawing, the typical embodiment of the features of the present invention indicated therein contains a plurality of components wherein the connections thereof are made as described in the following paragraphs. In this apparatus, the source of input signals is the input function source 10. In keeping with the foregoing illustration, this quantity of input pulses may be proportional to the amplitude of a radar return pulse. The apparatus provides an output signal to the output utilization circuit 12 which is a selected multiple of the input equal to or greater or less than unity.

Input function source 10 is connected to input register 13, the latter of which operates to store conditions indicative of the value of the input function. Typically, if the input function is contained as a plurality of binary digits, the input register could contain a plurality of Eccles-Jordan circuits which are connected in a conventional manner to store stable state conditions indicative of the values of input binary digits. Alternately where the input function is provided as a variable quantity series of pulses, the input register would be more appropriately arranged as a counter circuit also consisting of a plurality of Eccles-Jordan circuits, in this case however being connected in cascade whereby the output from one circuit is supplied to the input of a succeeding circuit and so forth. In either case however, the output from the register 13 is substantially the same, being in the form of a plurality of separate signals in separate lines indicative of the values of a plurality of binary digits representative of the value of the input function.

FIG. 1 contains a second function register 14 which typically is again a plurality of Eccles-Jordan circuits, however in this instance the counter form of connection is employed whereby the register counts pulses applied thereto in conventional manner and provides a binary digital output relative to the quantity thereof. Coincidence circuit 15 is connected to input register 13 and function register 14 in such manner as to indicate in a single output line 16 the achievement of a condition of equal binary digital representation between the registers 13 and 14. Thus when registers 13 and 14 have received equal quantities as represented by similarity in the binary digital values, an output condition is indicated by the production of a substantial voltage change in line 16. The production of such an output in line 16 does several things. In the first place it is applied to gate 17 which is interposed in the signal path to function register 14 to thereby cause the closure of gate 17 to prevent the further delivery of pulses to function register 14. In addition the production of a signal in line 16 likewise produces closure of gate 21, the purpose of which will be described subsequently in this description.

The signals applied to function register 14 through gate 17 during the appropriate "open" condition thereof, are obtained from control pulse source 11 being connected thereto through a plurality of taps on delay line 19, a plurality of unilateral impedance devices 20, and a plurality of control switches 18. Switches 18 actually are two banks of switches with one bank thereof being connected to gate 17, the other bank is such that the —1 switches 18 are connected to gate 17 and the —2 switches 18 are connected to gate 21. Delay line 19 has a plurality of taps disposed at substantially equally spaced points along the length thereof whereby each input pulse signal applied at the left end thereof appear in sequence with a prearranged delay at the various taps to finally reach the right hand end of the delay line. Thus by the connection of the gate 17 to a selectable number of these taps as selected by the —2 switches 18, each control pulse is caused to provide a plurality of pulses which are delivered to gate 17. The switches 18 are provided to produce such selection of the quantity of pulses delivered to gate 17 and likewise to separately and independently control the number of pulses also similarly supplied to gate 21. The devices 20 indicated as unilateral impedance devices are incorporated to provide isolation between the various sections of the delay line so that the undesired interaction of the portions when many switches are closed is avoided.

Gate 21 is connected to output register 22. This output register 22 is similar to register 14, being connected in the form of a counter whereby an output is obtained as a plurality of separate binary digits indicative of the quantity of pulses applied at the input thereto as obtained through gate 21. By virtue of the connections shown, during the transmissive condition of gate 21, a selectable quantity of pulses as obtained from the —2 switches 18 is applied to the output register 22. The application of such pulses is terminated by the occurrence of the coincidence condition in line 16 which closes gate 21 to prevent the further delivery of pulses to the output register 22.

The four lines indicative of binary digits obtained from register 22 are connected to output reader circuit 23 which is a form of gated output circuit providing in line 24 signals indicative of the binary conditions of the output register 22. For this purpose gated output reader circuit 23 is connected to the right hand end of delay line 19 to produce output signals under control of the delayed control pulses from source 11.

It is believed that the apparatus of output reader 23 is sufficiently well known as to be obvious to those skilled in the art, however, an example of apparatus which can be employed with appropriate connection and arrangement thereof is the apparatus of FIG. 12 of U.S. Patent 2,953,777 issued to D. H. Gridley, entitled "Shaft Position Converter Device." In its typical form the output reader 23 receives a plurality of simultaneous input signals from the output register 22, the connections to output register 22 corresponding to those numbered 279, 280, 281 and 282 in FIG. 12 of the aforementioned device, the tubes 239, 240, 241 and 242 being the coincidence tubes, with the multivibrator sequencing device 238 of FIG. 12 of the aforementioned patent providing sequential operation of the coincidence tubes so that the signals existent simultaneously in the input lines are sampled to appear in sequence in a single output line.

To produce a return of each of the various registers and gating circuits to a reference condition or state wherein the circuits are enabled for a subsequent operation sequence as described in the foregoing, a reset signal is obtained from the output reader and applied by means of connections to input register 13, function register 14, gate 21, gate 17 and output register 22. Normally this output signal would be produced in coincidence with the gate signal applied to the output reader 23 from the right end of delay line 19, however, the timing must be such as to avoid interference with the "read-out" of register 22. Circuits to produce such operation are well known in the art.

Much of the operation of the apparatus of FIG. 1 has been described in connection with the description of the figure itself, however, the following overall description integrating the various components and their time sequence may be helpful in understanding the operation thereof. In discussing typical operation of this circuit a situation wherein operation to produce multiplication of an input quantity by a factor of 1.25 may be selected as being a typical factor.

Typically for such an operation the input register 13 is supplied with four sequential pulse signals from input function source 10 so that it retains in binary form a condition indicative of such a quantity. With switches 18, —A1, —B1, —C1 and —E1 placed in the closed position and all other —1 switches 18 in the open position, and switches 18, —A2, —B2, —C2, —D2 and —E2 in the closed position with other switches 18 in the —2 category being open, the apparatus is in condition to produce multiplication by the desired factor of 1.25. With a single pulse signal typically having a duration of 2 microseconds applied from control pulse source 11 to the left end of delay line 19, four and five sequential pulses will be applied through gates 17 and 21 to function register 14 and output register 22, respectively. It is significant to note that the last pulse of each group applied to registers 14 and 22 occur in substantial coincidence, being taken from an E level tap on the delay line. The result of this is that gate 17 is initially open to deliver four pulses to function register 14. At the fourth pulse, function register 14 and input register 13 both having received a similar quantity of pulses represent corresponding conditions which are indicated by the production of a signal in line 16 by coincidence circuit 15. The production of this signal in line 16 closes gates 21 and 17 to prevent further transmission of pulse signals therethrough. The closure of gate 17 prevents the further delivery of pulses to function register 14 whereas the closure of gate 21 prevents the delivery of pulses to output register 22 which had been receiving pulses during the preceding period, a total of five pulses having been received by output register 22 in contrast to the four pulses which were delivered to function register 14. Thus the output register 22 has reached a condition indicative of the count of 5 which it will retain after the closure of gate 21. The condition so retained by output register 22 is read out by the output reader 23 as the control pulse of source 11 reaches the right hand end of delay line 19 to cause the production of output signals in line 24 for the output utilization circuit 12 and also to reset the registers 13, 14 and 22 and the gates 21 and 17 to reference conditions in preparation for a subsequent series of operations of the type of the foregoing. Thus since output register 22 stored the count of 5 responsive to a count of 4 from the input function source 10, the output quantity delivered to the output utilization circuit 22 will be related to the input by a factor of 1.25.

Thus it is obvious that the ratio provided by the overall apparatus is equal to the ratio of the number of switches 18 of the —2 series closed relative to the number of switches 18 of the —1 series closed, and that factors greater or less than unity as well as unity itself are available. A primary requirement in any event of course is that the last pulse of the series delivered to gate 21 does not occur subsequent to the last pulse of the series delivered to gate 17 which explains why the D tap of the delay line was not employed for register 14 in the foregoing.

From the foregoing it is apparent that multiplication factors of many different ratios are available with the typical 11 position delay line indicated in the typical embodiment of FIG. 1. It is also apparent that factors having a much more extreme ratio than that of 1/11 or 10/11 can be obtained by employing a greater quantity of taps on the delay lnie 19. It must be borne in mind however that the taps of the delay line must be spaced a sufficient distance apart on the delay line to where distinct pulses are produced at the various taps with distinct time separations therebetween to permit suitable operation of the various registers involved. It is further appropriate to note that the input function signals should be timed to where recurrence thereof is not at a frequency greater than that of the operation of the control pulse source 11 and that the control pulse source 11 must not operate at a frequency in excess of that corresponding to the maximum delay period of the delay line 19.

From the foregoing discussion it is apparent that a delay line 19 having very high quality characteristics is required where factors more complex than those including a quantity of 1/11 or 10/11 are involved and even these factors require a delay line having a high frequency response and low loss characteristics. Although delay lines having such characteristics can be constructed without extremely great difficulty, such delay lines do present unique problems and considerable expense. In many instances it is desirable to employ a plurality of shorter delay lines which are connected together through a suitable pulse generation circuit such as a blocking oscillator to provide a comparatively simple means for preserving sharpness of waveform and sufficient pulse power. To this end the apparatus of FIG. 2 offers possibility of less expensive and less bulky equipment in some instances.

Figure 2:
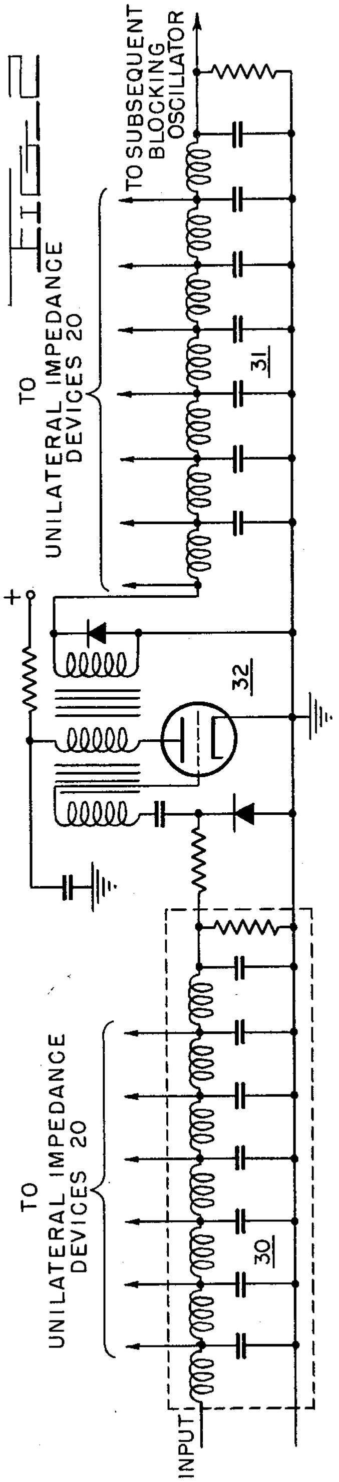
FIG. 2 shows a variation whereby multiplication or division by complex factors is possible employing delay lines of low quality characteristics.

With reference now to FIG. 2 of the drawing, the apparatus shown therein includes a delay line containing two portions 30 and 31 connected by a blocking oscillator 32. The blocking oscillator, which is normally cut-off, responds to the output pulse at the end of delay line portion 30 which is normally substantially distorted by a low quality delay line, and provides a new sharp pulse at the input to line 31. Such an arrangement can be repeated to where as many delay line taps are made available as are necessary to accommodate the multiplication ratio desired.

From the foregoing it is obvious that considerable modification of the invention is possible without exceeding the scope thereof as defined by the appended claim.

What is claimed is:

Apparatus for producing multiplication of a quantity by a factor comprising, an input register for storing the quantity as a plurality of binary digits, a delay line having a plurality of substantially equally time spaced taps along the length thereof, means for producing a control pulse signal having a duration less than the time spacing of the taps on the delay line, means connecting said last named means to the input of the delay line, a first counter circuit, means connecting the first counter circuit to the delay line including a first gate circuit and a plurality of first switches whereby a selectable quantity of pulses can be applied to the first counter when the first gate circuit is open, a second counter circuit, means connecting the second counter circuit to the delay line including a second gate circuit and a plurality of second switches whereby a selectable quantity of pulses can be applied to the second counter when the second gate circuit is open, coincidence means for producing a control signal when the first counter circuit and the input register attain a selected relationship therebetween, means applying the control signal to the first and second gate circuits to close said circuits in response thereto, means for producing a readout pulse delayed relative to the pulse produced at the last tap of the delay line connected to the counter circuits, and output means responsive to said readout pulse for delivering an output signal in dependency on the condition reached by the second counter circuit.

References Cited in the file of this patent

UNITED STATES PATENTS

| | | |
|---|---|---|
| 2,781,446 | Eckert et al. | Feb. 12, 1957 |
| 2,886,240 | Linsman | May 12, 1959 |
| 2,914,757 | Millership et al. | Nov. 24, 1959 |